United States Patent
Milletari et al.

(10) Patent No.: US 8,127,425 B2
(45) Date of Patent: Mar. 6, 2012

(54) GEAR PRODUCTION PLANT

(75) Inventors: Salvatore Milletari, Turin (IT); Giulio Barbato, Turin (IT)

(73) Assignee: AVIO S.p.A., Turin (IT)

( * ) Notice: Subject to any disclaimer, the term of this patent is extended or adjusted under 35 U.S.C. 154(b) by 1154 days.

(21) Appl. No.: 11/936,524

(22) Filed: Nov. 7, 2007

(65) Prior Publication Data
US 2008/0120826 A1 May 29, 2008

(30) Foreign Application Priority Data
Nov. 7, 2006 (IT) .............................. TO2006A0793

(51) Int. Cl.
*B23P 15/14* (2006.01)
*B23Q 39/04* (2006.01)
*B23Q 17/20* (2006.01)

(52) U.S. Cl. .......... 29/563; 29/564; 29/56.5; 29/893.35; 29/407.04; 356/625; 409/1

(58) Field of Classification Search ............. 29/563, 29/564, 56.5, 33 P, 893, 893.3, 893.35, 893.36, 29/407.01, 407.04; 356/626, 625; 409/1
See application file for complete search history.

(56) References Cited

U.S. PATENT DOCUMENTS

| | | | |
|---|---|---|---|
| 4,653,314 A * | 3/1987 | Van Dorn ........................ | 73/78 |
| 4,965,451 A | 10/1990 | Solter et al. | |
| 5,595,613 A | 1/1997 | Hatano et al. | |
| 5,667,300 A | 9/1997 | Mandelis et al. | |
| 7,712,955 B2 * | 5/2010 | Wang et al. ...................... | 374/7 |
| 7,827,692 B2 * | 11/2010 | Geiman ..................... | 29/893.3 |
| 2004/0011118 A1 | 1/2004 | Pryor | |

FOREIGN PATENT DOCUMENTS

| | | |
|---|---|---|
| CA | 2126481 | 12/1995 |
| GB | 1176747 | 1/1970 |

\* cited by examiner

*Primary Examiner* — Erica E Cadugan
(74) *Attorney, Agent, or Firm* — Fish & Richardson P.C.

(57) ABSTRACT

A gear production plant has, along a gear production path, a station for preparing a number of blanks; a cutting station, where respective teeth are cut on the blanks to obtain a number of semifinished parts; a heat treating station, where the toothed semifinished parts are carburized or nitrided; and a finish station for finish machining the heat treated semifinished parts; the plant also having a check station located along the production path, downstream from the heat treating station or the finish station, and which houses an optical measuring unit for non-destructively determining the effective carburized or nitrided case depth on the teeth.

5 Claims, 1 Drawing Sheet

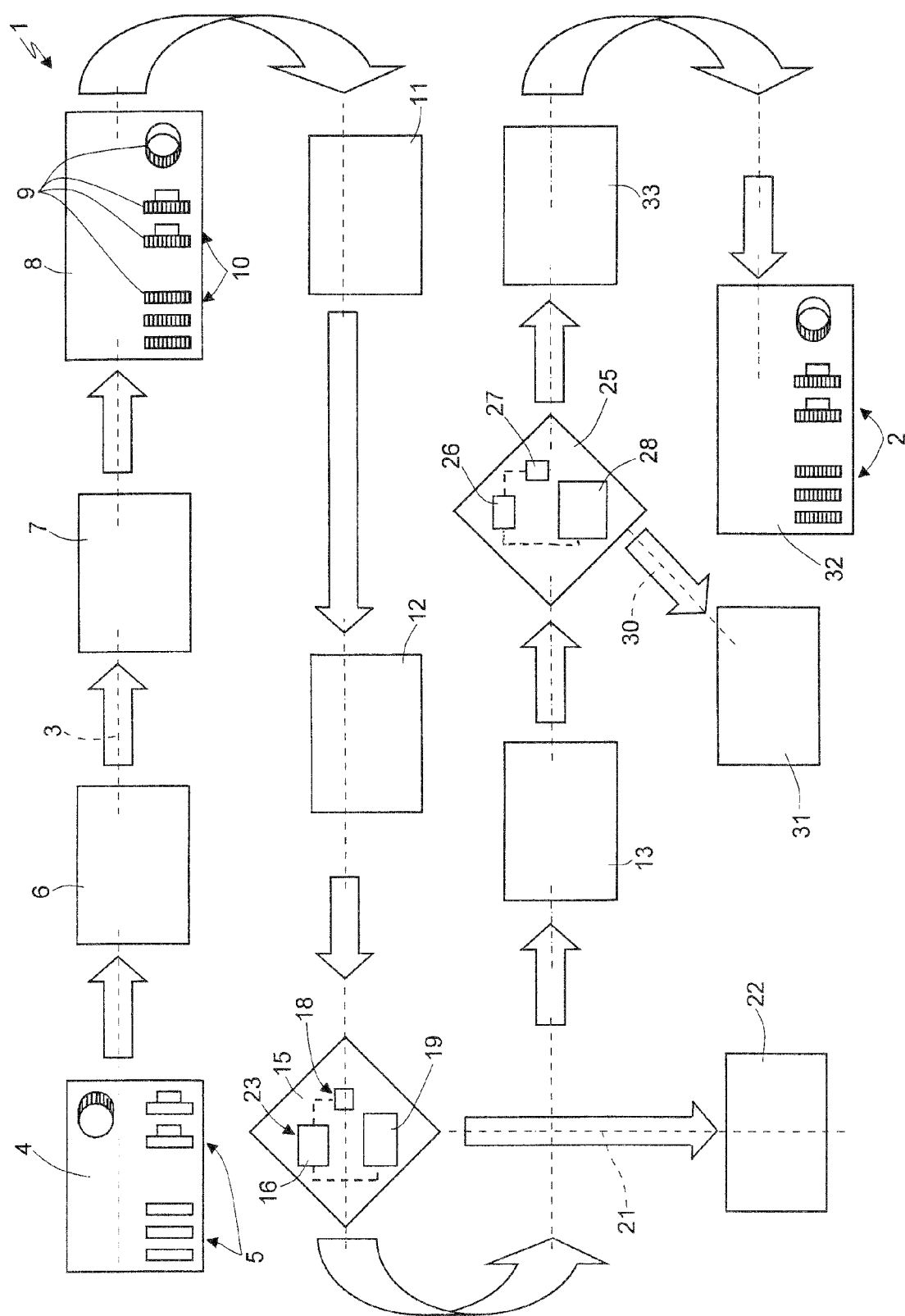

GEAR PRODUCTION PLANT

The present invention relates to a gear production plant.

BACKGROUND OF THE INVENTION

More specifically, the present invention relates to a plant for producing aircraft transmission gears. As is known, after being cut, aircraft gears undergo surface hardening, which, depending on the application, comprises carburizing or nitriding; after which, the gears undergo further processing and, normally, a finish machining operation, e.g. grinding.

To obtain gears of a given uniform surface strength, specimen carburized or nitrided gears are checked to determine the effective carburized or nitrided case depth of each specimen at various points as specified in a given quality control protocol. That is, after heat treating, specimen gears are taken off the production line and sectioned, and the effective carburized or nitrided case depths of the sectioned parts are determined at the specified points in known manner.

Alternatively, a predetermined number of test pieces are also produced alongside the gears and hardened in the same way, and, like the gears, are sectioned to determine the effective carburized/nitrided case depth.

Though universally adopted, the above known effective case depth checking method is unsatisfactory in various respects, foremost of which is the destructive nature of the method, which calls for sectioning both test pieces and gears. Moreover, it involves expense in terms of wastage of heat treated material, and, in particular, additional expense when using test pieces, and loss-of-production expense when sectioning actual gears.

Moreover, both test pieces and specimen gears are sectioned and measured at dedicated off-line stations, which means additional transfer and handling costs.

Finally, random specimen checks are no guarantee of the quality of production as a whole, and do not rule out the possibility of below-standard gears eventually being installed in, and so unacceptably impairing the efficiency and reliability of, the transmission.

SUMMARY OF THE INVENTION

It is an object of the present invention to provide a gear production plant designed to provide a straightforward, low-cost solution to the above problems.

According to the present invention, there is provided a gear production plant comprising, along a gear production path, a station for preparing a number of blanks; a cutting station, where respective teeth are cut on the blanks to obtain a number of semifinished parts; a heat treating station, where the toothed semifinished parts are carburized or nitrided; and a finish station for finish machining the heat treated semifinished parts; the plant being characterized by also comprising a check station located along said production path, downstream from said heat treating station or said finish station; said check station at least partly housing first optical measuring means for non-destructively determining the carburized or nitrided case depth of said teeth.

The plant defined above preferably comprises a check station located along said production path, between said heat treating station and said finish station; and a check station located along said production path, downstream from said finish station in the travelling direction of the semifinished parts; both said check stations at least partly housing respective said optical measuring means.

Said optical measuring means are conveniently housed entirely in the respective said check station.

BRIEF DESCRIPTION OF THE DRAWING

The invention will now be described with reference to the attached drawing, which shows, schematically and substantially in block form, a preferred embodiment of the gear production plant according to the present invention.

DETAILED DESCRIPTION OF THE INVENTION

Number 1 in the attached drawing indicates as a whole a complete plant for producing aircraft internal or external or face gears 2. Plant 1 comprises, along a gear 2 production path 3, a store 4 housing a number of blanks 5; and a station 6 for preparing or roughing blanks 5. The prepared, pre-treated blanks 5 are transferred to a preliminary heat treating station 7 and from there to a cutting station 8, both forming part of plant 1. Teeth 9 are cut on each blank 5 at station 8 to obtain a number of semifinished toothed parts 10, which are tested at a station 11 and prepared before being transferred along path 3 to a heat treating station 12, where the semifinished parts 10 are carburized or nitrided. The heat treated semifinished parts 10 are then transferred to a finish station 13, where they are finish machined. Stations 11, 12 and 13 all form part of plant 1.

As shown in the attached drawing, plant 1 also comprises a check station 15 located along production path 3, between heat treating station 12 and finish station 13. Check station 15 houses an optical, e.g. laser, measuring unit, indicated as a whole by 16 and conveniently of the type described in American Patent Application U.S. Pat. No. 5,667,300 and Canadian Patent Application N. 2 126 481, for non-destructively determining the effective carburized or nitrided case depth of semifinished parts 10 from heat treating station 12. Station 15 also houses a detecting and control device 18 —conveniently also optical or mechanical—for detecting each semifinished part 10 entering station 15, and for activating unit 16 to make at least one effective carburized/nitrided case depth measurement of each semifinished part 10. Conveniently, unit 16 performs a number of measurements at various points on the toothed surface of each semifinished part 10. Station 15 also comprises a reject unit 19 associated with device 18, and which is controlled by unit 16 to divert any semifinished parts 10 with other than the predetermined carburized/nitrided case depths, i.e. rejects, onto a reject path 21 off production path 3 and to a reject dump 22. Measuring unit 16 preferably forms part of a carriage-mounted unit 23 movable within station 15.

As shown in the attached drawing, plant 1 also comprises a further check station 25 housing a measuring unit 26, a device 27, and a reject unit 28, similar to unit 16, device 18, and unit 19 respectively, to determine the effective carburized/nitrided case depth of the finished gears, and divert off production path 3 onto a reject path 30 to a reject dump 31 any gears 2 with other than the predetermined effective carburized/nitrided case depth. The other gears 2 continue along production path 3 to a store 32, via a surface treatment station 33 where they are stopped for surface treatment if necessary.

As will be clear from the foregoing description, unlike known solutions, the check stations for determining the effective carburized/nitrided case depth of gears 2 are located along the gear 2 production line, thus eliminating the cost and logistic problems of known "off-line" carburized/nitrided case depth measuring solutions.

Moreover, check stations 15, 25 are equipped with non-destructive optical measuring units, thus eliminating additional cost in terms of treated and/or machined material waste, that cannot be salvaged once it is sectioned. Using optical carburized/nitrided case depth measuring equipment also eliminates the need for test pieces produced alongside the gears, and safeguards against spurious data resulting from test pieces differing in shape and size from the gears.

Using optical measuring units also drastically reduces measuring time, which amounts solely to directing a light beam onto the gear; while arranging the optical measuring units along the production path of gears 2, i.e. "on line", enables troublefree checking of each gear, thus guaranteeing the quality of the gears in stock.

Clearly, changes may be made to plant 1 as described herein without, however, departing from the protective scope as defined in the accompanying claims. In particular, plant 1 may comprise stations differing from those indicated by way of example. For example, plant 1 may comprise only one of check stations 15, 25, and additional or different processing station, e.g. sanding or heat treatment, stations for specific types of gears and, in particular, for nitrided gears.

Check stations 15, 25 may be equipped with measuring units 16, 26 for non-destructively checking the product as it is gradually produced, but of a different type from that indicated by way of example. Also, the measuring units 16, 26 may comprise parts housed in check stations 15, 25, and parts, e.g. more sensitive to vibration, dust and/or magnetic fields, installed remotely and wired to the in-station parts.

The invention claimed is:

1. A gear production plant comprising, along a gear production path,
    a station for preparing a number of blanks;
    a cutting station, where respective teeth are cut on the blanks to obtain a number of semifinished parts;
    a heat treating station, where the toothed semifinished parts are carburized or nitrided; and
    a finish station for finish machining the heat treated semifinished parts;
    the plant also comprising a first check station, located along said production path, downstream from said heat treating station or said finish station;
    said check station at least partly housing optical measuring means for non-destructively determining the carburized or nitrided case depth of said teeth without mechanical contact of the measuring means with the teeth.

2. A plant as claimed in claim 1, wherein said first check station is located along said production path, between said heat treating station and said finish station; said plant further comprising a second check station located along said production path, downstream from said finish station in the travelling direction of the semifinished parts; both said check stations at least partly housing respective said optical measuring means.

3. A plant as claimed in claim 1, wherein said optical measuring means are housed entirely in the respective said check station.

4. A plant as claimed in claim 1, wherein said first check station comprises detecting means for detecting each of the semifinished parts or gears travelling along said production path, and wherein said optical measuring means are for performing one or more measurements of said carburized or nitrided case depth on each of the semifinished parts or gears travelling through the first check station; reject means being provided to divert onto a reject path, separate from said production path, any semifinished parts or gears having other than predetermined case depths.

5. A plant as claimed in claim 1, wherein said optical measuring means form part of a carriage-mounted unit movable within the respective said check station.

* * * * *